US006882504B2

(12) United States Patent
Boutaghou et al.

(10) Patent No.: US 6,882,504 B2
(45) Date of Patent: Apr. 19, 2005

(54) MICRO TEXTURED SLIDER WITH PREDICTED TIPPED POSITION

(75) Inventors: Zine-Eddine Boutaghou, North Oaks, MN (US); Jing Gui, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 213 days.

(21) Appl. No.: 09/885,513

(22) Filed: Jun. 20, 2001

(65) Prior Publication Data

US 2002/0012200 A1 Jan. 31, 2002

Related U.S. Application Data

(60) Provisional application No. 60/212,942, filed on Jun. 20, 2000.

(51) Int. Cl.[7] .................................................. G11B 5/60
(52) U.S. Cl. .............................. 360/236.6; 360/236.8; 360/236.9; 360/237
(58) Field of Search .......................... 360/236.6, 236.5, 360/236.1, 236, 236.2, 236.7, 236.8, 236.9, 237, 237.1

(56) References Cited

U.S. PATENT DOCUMENTS

| 5,067,037 | A |  | 11/1991 | Ananth et al. ............... 360/103 |
|---|---|---|---|---|
| 5,079,657 | A |  | 1/1992 | Aronoff et al. .............. 360/103 |
| 5,200,867 | A |  | 4/1993 | Albrecht et al. ............. 360/103 |
| 5,202,803 | A |  | 4/1993 | Albrecht et al. ......... 360/97.02 |
| 5,267,104 | A |  | 11/1993 | Albrecht et al. ......... 360/97.02 |
| 5,345,353 | A |  | 9/1994 | Krantz et al. ............... 360/103 |
| 5,418,667 | A |  | 5/1995 | Best et al. ................... 360/103 |
| 5,499,149 | A |  | 3/1996 | Dovek ......................... 360/103 |
| 5,550,691 | A |  | 8/1996 | Hamiton ...................... 360/103 |
| 5,550,693 | A |  | 8/1996 | Hendriks et al. ............ 360/103 |
| 5,572,386 | A |  | 11/1996 | Ananth et al. ............... 360/103 |
| 5,625,512 | A |  | 4/1997 | Smith .......................... 360/103 |
| 5,726,831 | A |  | 3/1998 | White .......................... 360/103 |
| 5,768,055 | A |  | 6/1998 | Tian et al. ................... 360/103 |
| 5,796,551 | A |  | 8/1998 | Samuelson ................... 360/103 |
| 5,815,346 | A | * | 9/1998 | Kimmal et al. ........... 360/99.08 |
| 5,841,608 | A |  | 11/1998 | Kasamatsu et al. ......... 360/103 |
| 6,057,984 | A | * | 5/2000 | Arita et al. .................. 360/103 |
| 6,188,547 | B1 |  | 2/2001 | Gui et al. ................. 360/236.5 |
| 6,297,932 | B1 | * | 10/2001 | Liu .......................... 360/235.8 |
| 6,381,090 | B1 | * | 4/2002 | Suzuki et al. .............. 184/13.1 |
| 6,396,661 | B1 | * | 5/2002 | Yokohata et al. ........... 360/135 |
| 6,424,495 | B1 | * | 7/2002 | Kobayashi et al. ...... 360/236.5 |
| 6,466,410 | B1 | * | 10/2002 | Polycarpou et al. ..... 360/236.6 |
| 6,535,353 | B1 | * | 3/2003 | Boutaghou et al. ...... 360/235.1 |
| 6,538,849 | B1 | * | 3/2003 | Fayeulle et al. ......... 360/236.3 |
| 6,603,639 | B1 | * | 8/2003 | Polycarpou et al. ..... 360/235.8 |
| 2002/0012199 | A1 | * | 1/2002 | Polycarpou et al. ..... 360/236.6 |

FOREIGN PATENT DOCUMENTS

WO      WO 00/68940      11/2000

* cited by examiner

*Primary Examiner*—Brian E. Miller
(74) *Attorney, Agent, or Firm*—Westman, Champlin & Kelly, P.A.

(57) ABSTRACT

A slider for a data head including a dynamically imbalanced slider landing integrated pad interface (SLIP interface) forming a predicted tipped interface. For contact starts and stops the SLIP interface supports the slider so that the slider tips toward the predicted tipped interface. The predicted tipped interface includes a tribological surface to provide desired stiction control at the tipped interface.

11 Claims, 8 Drawing Sheets

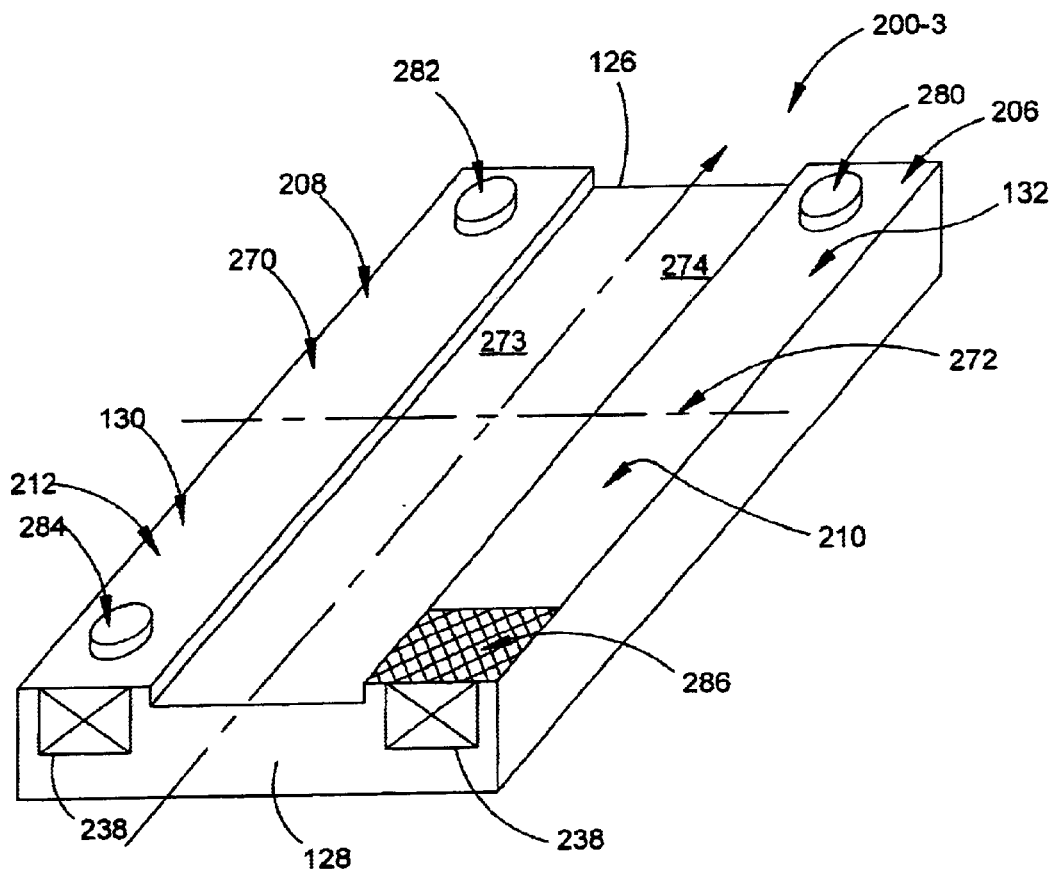
FIG. 9
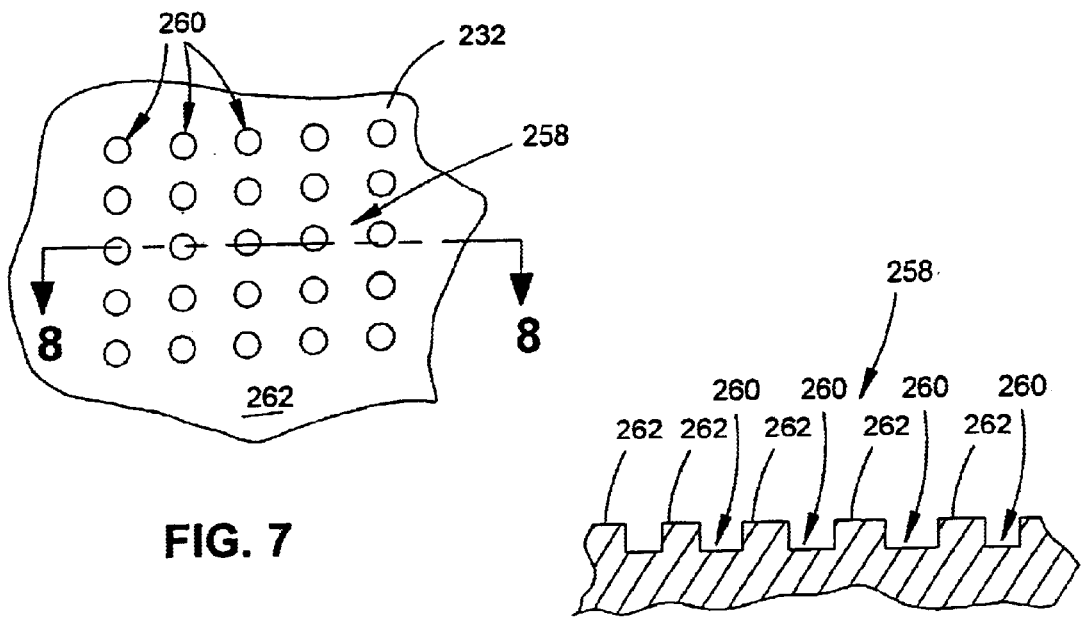
FIG. 7
FIG. 8

MICRO TEXTURED SLIDER WITH PREDICTED TIPPED POSITION

CROSS-REFERENCE TO RELATED APPLICATION

This application claims priority to Provisional Application Ser. No. 60/212,942, filed Jun. 20, 2000 and entitled "MICRO TEXTURED SLIDER WITH PREDICTED TIPPED POSITION".

FIELD OF THE INVENTION

The present invention relates to a data storage device. In particular, the present invention relates to a slider for improved stiction control.

BACKGROUND OF THE INVENTION

Data storage devices include discs adapted to store digital information. Discs are supported for rotation by a spindle motor to read data from or write data to disc surfaces. Heads carrying transducer elements are supported relative to the disc surface for read or write operations. Transducer elements of the head are fabricated on a slider which is supported relative to the disc surface by a head suspension assembly.

Prior to operation, the slider is supported or rests on the disc surface for contact starts and stops (CSS). The suspension assembly supplies a preload force to the slider to bias the slider toward the disc surface. The disc surface is typically coated with a lubricant film layer and the preload force creates a stiction force tending to "glue" or hold the slider to the disc surface. For operation, motor torque for the spindle motor must overcome the stiction force holding the slider to the disc surface. For an air bearing slider, rotation of the disc creates an air flow along the length of the slider from a leading edge to a trailing edge of the slider. Air flow along an air bearing surface of the slider creates a hydrodynamic lifting force due to pressure increase between the disc surface and air bearing surface so that the slider flies along the disc surface for read or write operations. For "spin-up", the hydrodynamic lifting force caused by rotation of the disc must be sufficient to overcome the pre-load force to the slider and stiction force holding the slider to the disc surface.

To reduce stiction between the slider and disc surface for contact starts and stops (CSS), slider designs include slider landing integrated pads or SLIPs. SLIPs are elevated above the bearing surface of an air bearing slider to reduce stiction between the slider and the disc surface for CSS. SLIPs are typically fabricated from a diamond-like carbon. Areal disc drive density is increasing and slider fly heights are decreasing for desired read/write resolution. Sliders are typically supported for operation at a pitch angle with the trailing edge of the slider supported closer to the disc surface than the leading edge. SLIPs are typically spaced from the trailing edge of the slider to limit contact interface between the slider and disc surface during operation. The recessed position of the SLIPs from the trailing edge of the slider increases the propensity of the supported slider to tip increasing dwell stiction at a tipped slider-disc interface. The present invention addresses these and other problems and offers solutions not previously recognized nor appreciated.

SUMMARY OF THE INVENTION

The present invention relates to a slider for a data head including a dynamically imbalanced slider landing integrated pad interface (SLIP interface) forming a predicted tipped interface. For contact starts and stops the SLIP interface supports the slider so that the slider tips towards the predicted tipped interface. The predicted tipped interface includes a tribological surface to provide desired stiction control at the tipped interface. These and various other features as well as advantages which characterize the present invention will be apparent upon reading the following detailed description and review of the associated drawings.

BRIEF DESCRIPTION OF THE DRAWINGS

FIG. 7 is a schematic illustration of a texture pattern for a bearing surface interface at the predicted tipped position.

FIG. 8 is a cross-sectional view taken along line 8—8 of FIG. 7.

FIG. 9 is a schematic illustration of an alternate embodiment of a slider having a dynamically imbalanced SLIP interface and a bearing surface interface at a predicted tipped position at a trailing edge portion of the slider.

DETAILED DESCRIPTION OF ILLUSTRATIVE EMBODIMENTS

Figure 1:
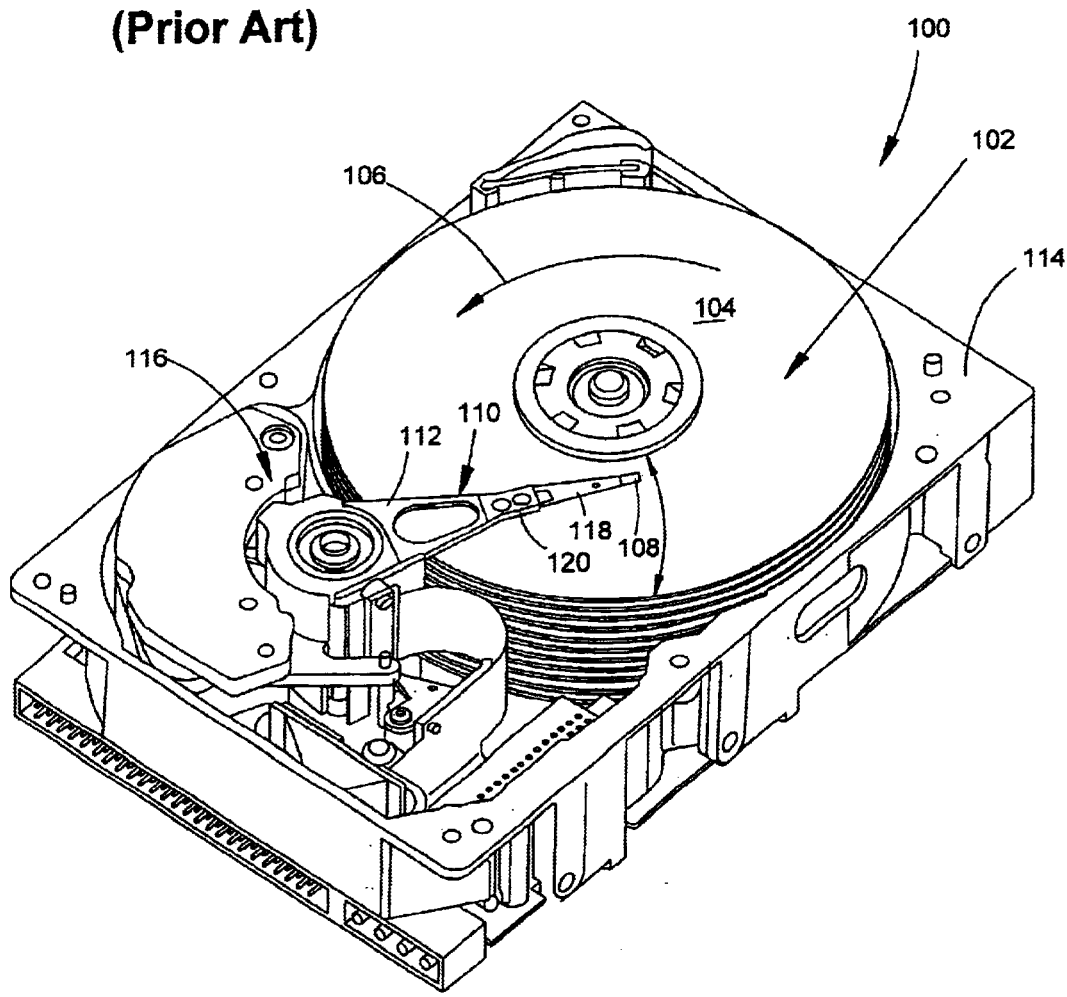
FIG. 1 is perspective illustration of a data storage device.

FIG. 1 illustrates an embodiment of a data storage device 100 including a disc stack 102 having a plurality of discs 104 supported for co-rotation as illustrated by arrow 106 by a spindle motor (not shown) for read-write operations. Heads 108 (only one visible in FIG. 1) are movably supported relative to a disc surface via an actuator assembly 110. The actuator assembly 110 includes an actuator block 112 rotationally coupled to a base chassis 114 of the device 100 and movable by a voice coil motor 116. A suspension assembly 118 is coupled to an arm 120 of the actuator block 112 to flexibly support heads 108 relative to the disc surface for read-write operations.

Figure 2:
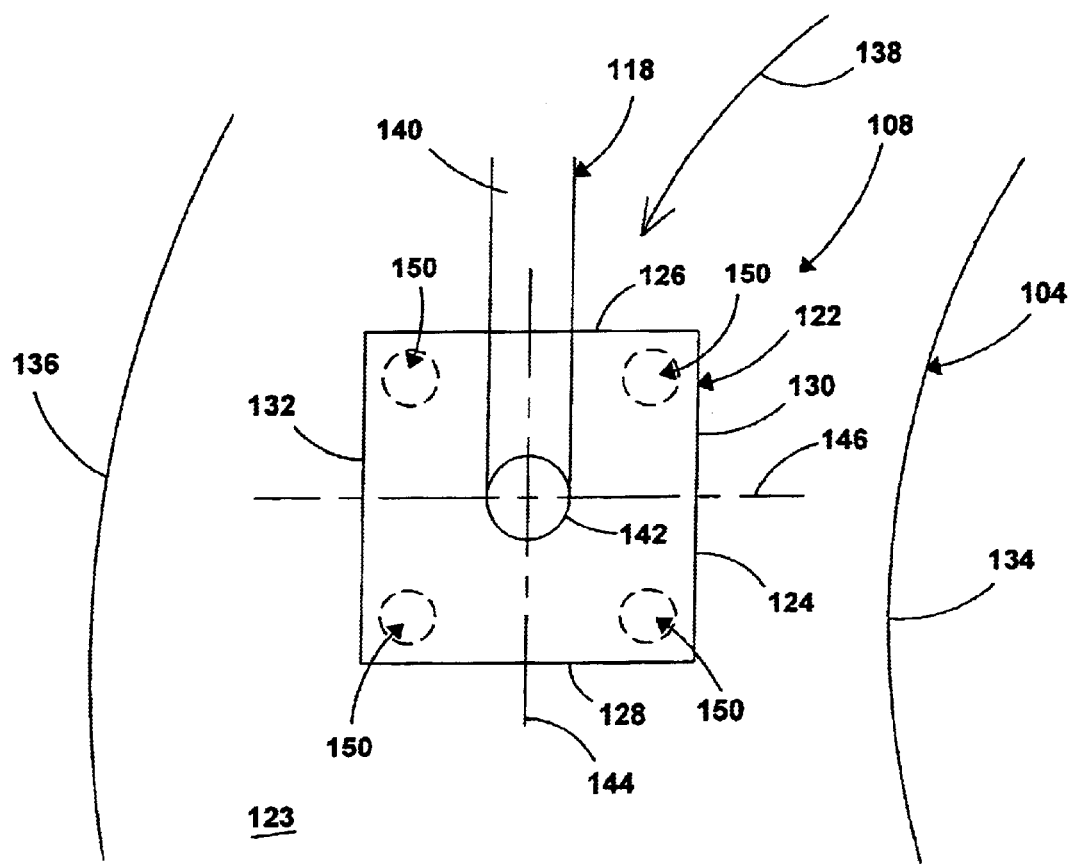
FIG. 2 is a schematic illustration of a slider supported relative to a disc surface for contact starts and stops.

Heads 108 include a slider 122 which is supported above the disc surface 123 for read-write operations as illustrated in FIG. 2. Slider 122 includes a slider body 124, a leading edge 126, a trailing edge 128 and opposed inner and outer side portions 130, 132 positioned relative to inner and outer diameters 134, 136 of the disc 104. Transducer elements such as magnetoresistive, inductive or magneto-optical transducer elements are supported proximate to the trailing edge 128 of the slider for read/write operations.

The slider is supported so that rotation of the disc provides an air flow as illustrated by arrow 138 from the leading edge 126 to the trailing edge 128 of the slider 122. Suspension assembly 118 includes a load beam 140 which supplies a load force to the slider at a load point 142 about which the slider 122 pitches and rolls. Load point 142 defines a fulcrum point for movement of the slider relative to a longitudinal axis 144 and transverse axis 146. Longitudinal axis 144 extends along a length of the slider 122 between the leading and trailing edges 126, 128 and transverse axis 146 extends along a width of the slider 122 transverse to the longitudinal axis 144.

For contact-starts and stops (CSS), the slider is supported on the disc surface 123. Typically the disc surface is coated with a thin lubricant film. Contact interface between the slider and disc surface or lubricant film layer creates a stiction force which holds the slider 122 to the disc surface 123. For operation, motor torque rotating the disc or disc stack must overcome the stiction force holding the slider 122 to the disc surface 123. Increased stiction increases the motor torque required for operation or "spin up". As previously discussed, prior slider designs include slider integrated pads (SLIP) 150 for stiction control. SLIPs 150 face the disc surface and elevate the slider 122 from the disc surface 123 for CSS. SLIPs are typically spaced from the trailing edge 128 of the slider for fly height clearance which increases the propensity for the trailing edge of the slider 122 to tip increasing dwell stiction at the trailing edge of the slider.

Figure 3:
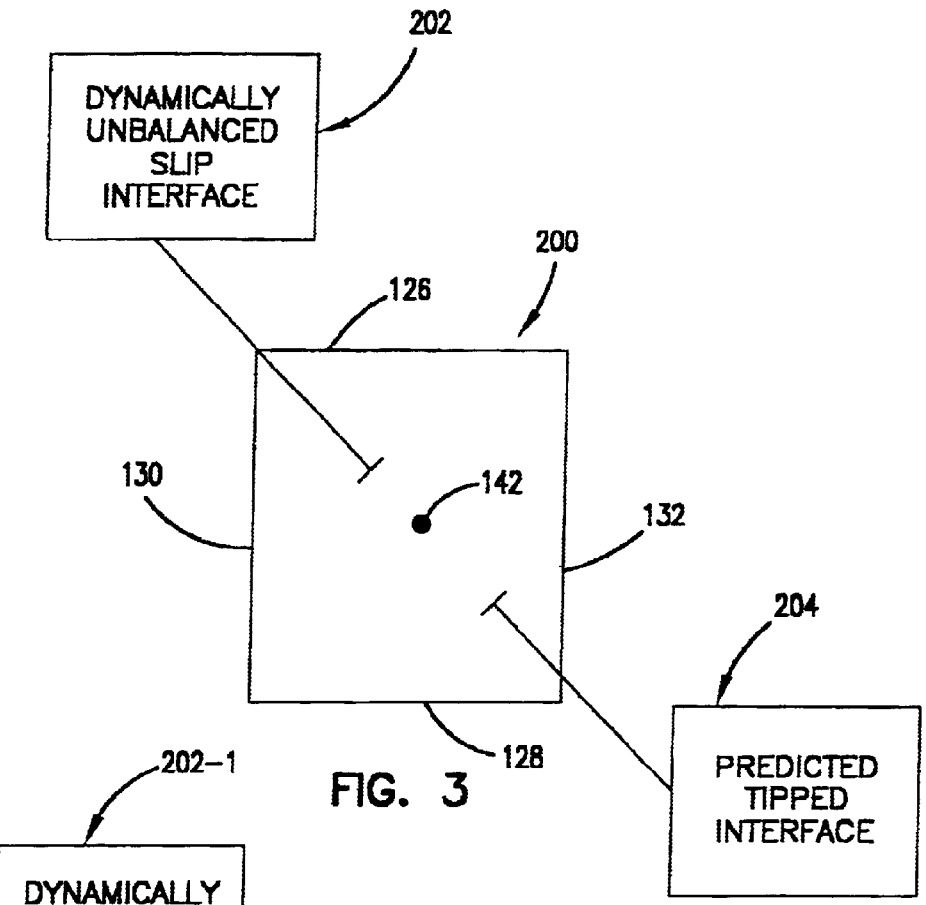
FIG. 3 is a schematic illustration of a slider having a dynamically imbalanced SLIP interface forming a predicted tipped interface.
Figure 4:
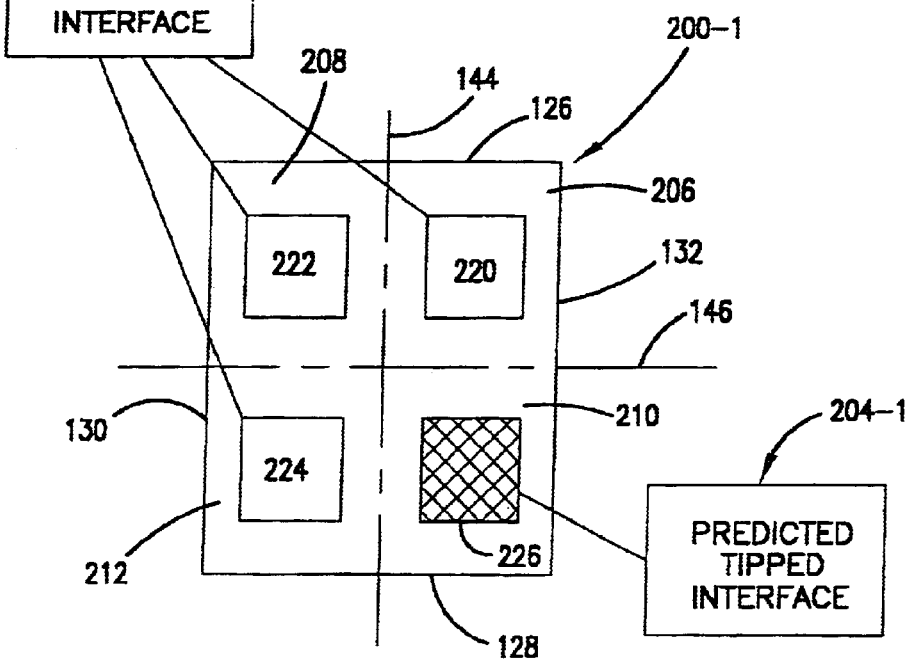
FIG. 4 is a schematic illustration of a slider having a dynamically imbalanced SLIP interface forming a predicted tipped interface at a trailing edge portion of the slider.

The present invention relates to a slider 200 having a dynamically imbalanced SLIP interface 202 and a predicted tipped interface 204 as illustrated schematically in FIG. 3 for CSS where like numbers are used to refer to like parts in the previous FIGS. FIG. 4 schematically illustrates an embodiment of a slider 200-1 including a dynamically imbalanced SLIP interface 202-1 and predicted tipped interface 204-1. The illustrated slider 200-1 is sectioned into quadrant portions including opposed leading edge portions 206, 208 and opposed trailing edge portions 210, 212.

As shown, leading edge portions 206, 208 and trailing edge portion 212 include an elevated SLIP interface 220, 222, 224 facing the disc surface as illustrated schematically, which cooperatively form the dynamically imbalanced SLIP interface 202-1 having a predicted tipped interface 204-1 at trailing edge portion 210. The predicted tipped interface 204-1 includes a textured interface surface 226 to provide a tribological surface for stiction control as shown schematically. Thus, for contact starts and stops, the supported slider 200-1 tips toward the predicted tipped interface 204-1 at trailing edge portion 210 of the slider 200-1.

In the illustrated embodiment trailing edge portion 212 is proximate to inner side portion 130 and the predicted tipped interface on the trailing edge portion 210 is proximate to the outer side portion 132 of the slider. As previously described, rotation of discs 104 creates an air flow path illustrated by arrow 138 in FIG. 2 including a tangential flow component between the inner and outer side portions 130, 132 of the slider. Thus in the illustrated embodiment, the predicted tipped interface 204-1 is positioned proximate to the outer side portion 132 of the slider 200-1 in alignment with the flow direction 138 imposed by rotation of the discs so that windage of the rotating disc tips the slider toward the predicted tipped interface 204-1.

Figure 5:
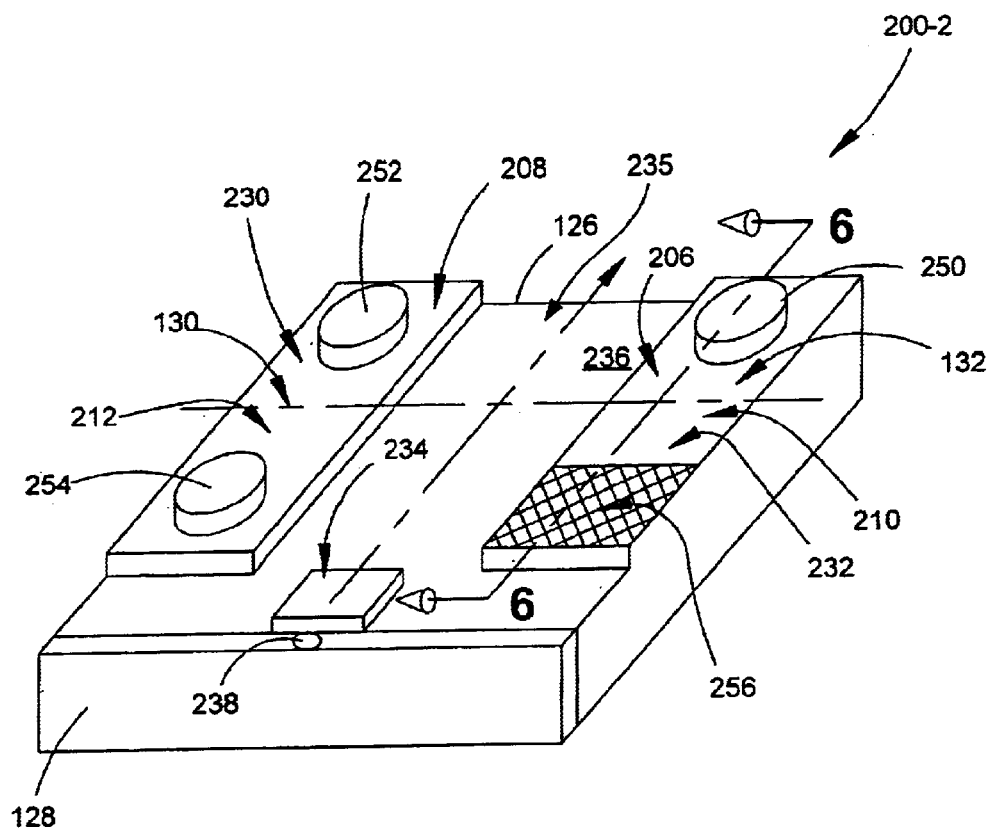
FIG. 5 is a schematic illustration of a slider including opposed raised bearing rails supporting a dynamically imbalanced SLIP interface to form a bearing surface interface at a predicted tipped position at a trailing edge portion of the slider.
Figure 6:
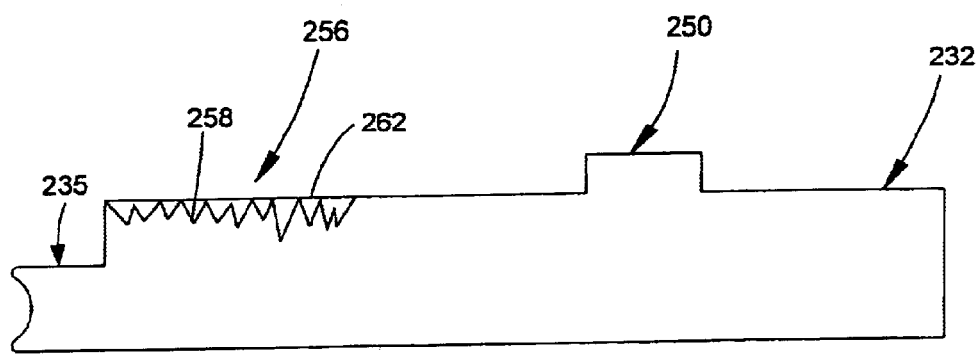
FIG. 6 is a cross-sectional view taken along line 6—6 of FIG. 5.

FIGS. 5–6 illustrate an embodiment of a slider 200-2 with a dynamically imbalanced SLIP interface and predicted tipped interface. As shown, the slider 200-2 include raised side rails 230, 232 and raised bearing pad 234 elevated above a recessed bearing surface 235 of a slider body 236. Side rails 230, 232 are formed on opposed first and second side portions 130, 132 aligned relative to the leading and trailing edges 126, 128 of the slider so that side rail 230 is aligned relative to an inner diameter of a disc and side rail 232 is aligned relative to an outer diameter of a disc. Raised bearing pad 234 is elevated above recessed bearing surface 235 and is positioned proximate to the trailing edge 128 of the slider body 236. The raised bearing surfaces 230, 232, 234 face the disc surface so that rotation of the disc creates an air flow along the raised bearing surfaces 230, 232, 234 from the leading edge 126 to the trailing edge 128 of the slider 200-2 for proximity or near proximity recording operation. In the illustrated embodiment, transducer element 238 (illustrated schematically) is supported proximate to the trailing edge 128 of the slider 200-2 which is supported at a pitch angle so that the transducer element 238 is supported proximate to the disc surface for operation.

As shown, rails 230, 232 include elevated SLIPs 250, 252, 254. SLIPs 250, 252, 254 extend from raised surfaces of bearing rails 230, 232 to provide an elevated SLIP interface structure which extends above bearing surfaces of the slider 200-2 for contact interface. SLIPs 250, 252, 254 are formed on leading edge portions 206, 208 of the slider 200-2 and trailing edge portion 212 to cooperatively form a dynamically imbalanced SLIP interface. SLIPs 250, 252 on leading edge portions 206, 208 are dynamically balanced between opposed side portions of the slider. SLIP 254 at trailing edge portion 212 is dynamically unbalanced relative to trailing edge portion 210 to form a predicted tipped interface at trailing edge portion 210. Trailing edge portion 210 includes a bearing surface interface 256 at the predicted tipped position. In the embodiment shown, the dynamically imbalanced SLIP 254 is formed on the inner portion 130 of the slider and the bearing surface interface 256 is formed on the outer portion 132 to induce tipping of the slider in the direction of air flow between the inner and outer side portions of the slider.

As illustrated in FIG. 6, the bearing surface interface 256 has a textured or roughened surface 258 to provide a desired roughness average Ra for stiction control. The textured or roughened surface 258 is fabricated by known manufacturing techniques on a portion of the raised bearing surface of trailing edge portion 210. The textured or roughened surface 258 of the bearing surface interface 256 is a small portion of the total area of the raised bearing surface of the slider and/or rail 232 and thus does not significantly affect the aerodynamics of the raised air bearing for read-write operations. The textured or roughened surface 258 can have random texture or a patterned texture. FIGS. 7–8 illustrate an embodiment of a patterned texture. Patterned texture includes a plurality of surface depressions 260 formed in the raised bearing surface 262 in a selected or predicted pattern by photolithography or laser techniques.

FIG. 9 illustrates an alternate embodiment of a dynamically imbalanced slider 200-3 with predicted tipped interface for a dual rail slider design. Slider 200-3 includes opposed raised side rails 270, 272 elevated above recessed bearing surface 273 which extend between the leading and trailing edges 126, 128 of the slider body 274. Transducer elements 238 illustrated diagrammatically are formed proximate to trailing edge 128 as shown. In the illustrated embodiment, leading edge portions 206, 208 and trailing edge portion 212 includes SLIPs 280, 282, 284 cooperatively forming a dynamically imbalanced elevated SLIP interface and a bearing surface interface 286 at a predicted tipped position on trailing edge portion 210 of the slider 200-3. SLIPs 280, 282 are dynamically balanced between opposed leading edge side portions 206, 208 and SLIP 284 is dynamically unbalanced relative to trailing edge portion 210 to form the predicted bearing surface interface 286 at the predicted tipped position.

FIGS. 10–13 illustrate an alternate embodiment of a dynamically imbalanced slider 200-4 with predicted tipped interface. The slider 200-4 includes a slider body 288 having raised bearing rails 290, 292 and raised center pad 294 elevated above a recessed bearing surface 295. Raised bearing rails 290, 292 incorporate a multi-tiered bearing structure with dampening trenches for desired dynamic response and settling for optimizing bearing dynamics. The multi-tiered structure includes multiple surface tiers including a raised tier 296, and a stepped tier 298. As shown, a raised U-shaped ledge 300 is fabricated on the stepped tier 298 by known masking processes to form a trench channel 302 for desired dynamic response. As shown in FIGS. 10–13, raised tier 296 is positioned proximate to the leading edge 126 of the slider and U-shaped ledge 300 is formed proximate to the trailing edge 128.

In the illustrated embodiment, leading edge portions 206, 208 include a plurality of elevated SLIPs 304-1, 304-2, 304-3, 306-1, 306-2, 306-3 formed on raised tier 296 of rails 290, 292. SLIPs 304-1, 304-2, 304-3, 306-1, 306-2, 306-3 are dynamically balanced between opposed leading edge portions 206, 208 of the slider. Trailing edge portion 212 includes an elevated SLIP interface structure having interface portions 308-1, 308-2 formed on the U-shaped ledge 300. Interface portions 308-1, 308-2 on trailing edge portion 212 are dynamically imbalanced relative to trailing edge portion 210 to form a bearing surface interface 310 at a predicted tipped position proximate to the trailing edge portion 210 as shown in FIG. 10.

Figure 10:
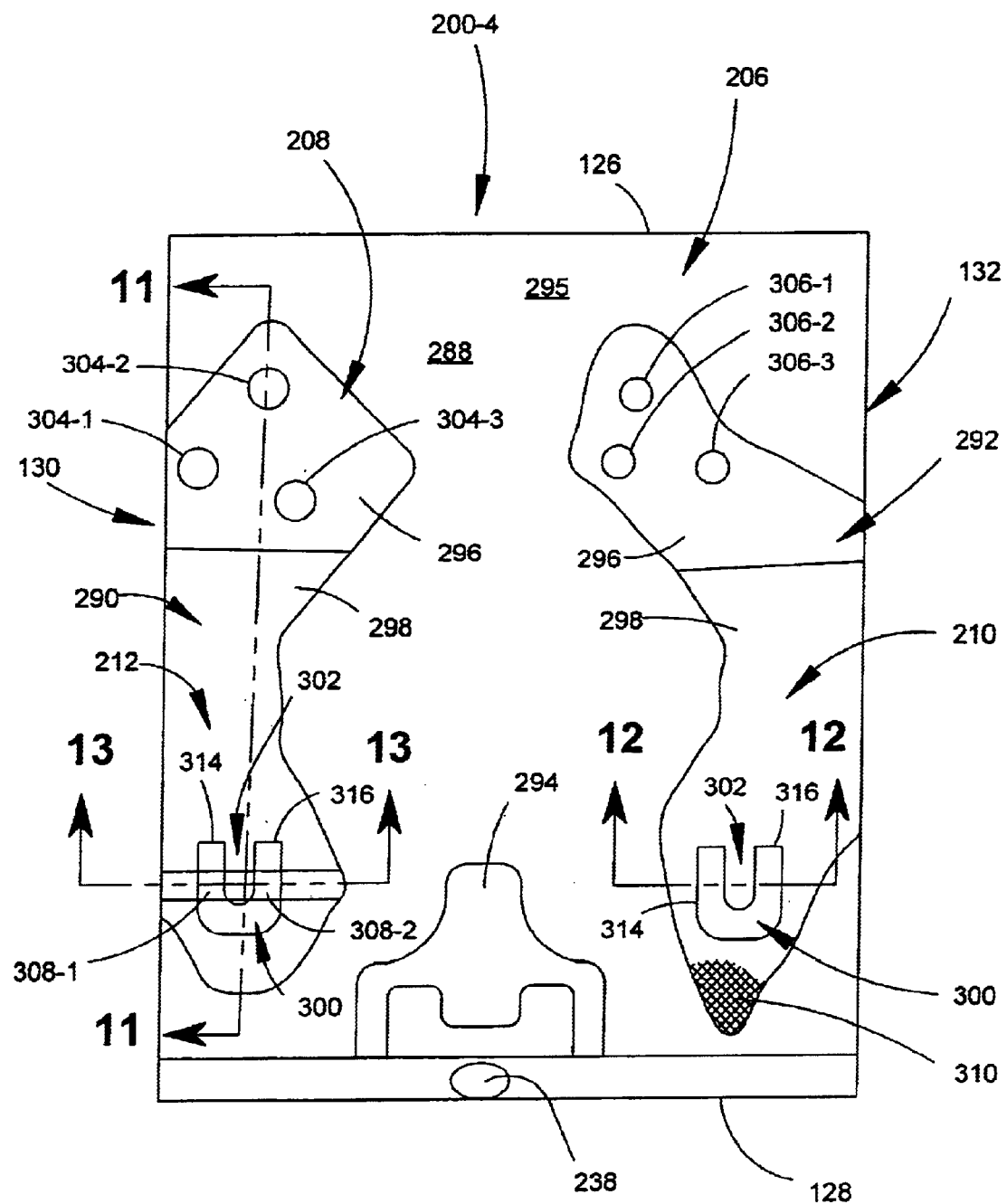
FIG. 10 is a schematic illustration of a trench damped slider including a dynamically imbalanced SLIP interface and a bearing surface interface at a predicted tipped position formed by the dynamically imbalanced SLIP interface.
Figure 11:
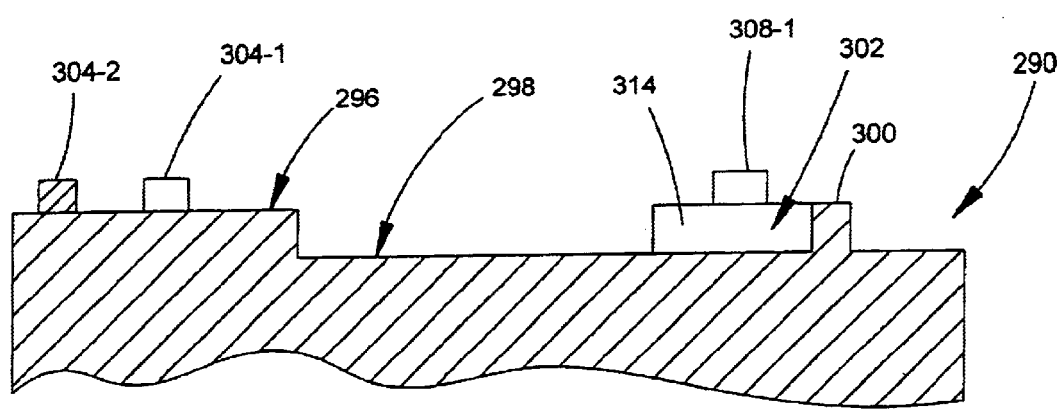
FIG. 11 is a cross-sectional view taken along line 11—11 of FIG. 10.
Figure 12:
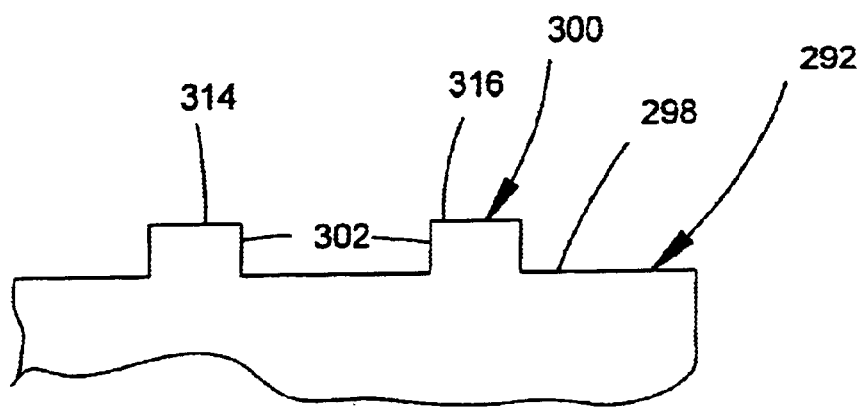
FIG. 12 is a cross-sectional view taken along line 12—12 of FIG. 10.
Figure 13:
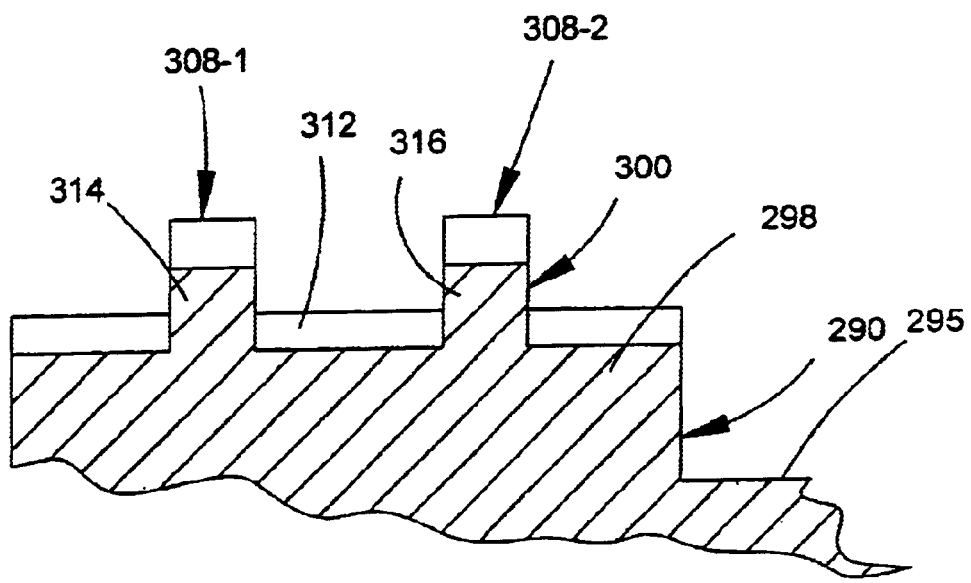
FIG. 13 is a cross-sectional view taken along line 13—13 of FIG. 10.

In the embodiment shown in FIGS. 10 and 13, elevated interface portions 308-1, 308-2 are formed of a strip 312 deposited between opposed sides of rail 290. Portions of deposited strip 312 on legs 314, 316 of U-shaped ledge 300 form multiple SLIPs 308-1, 308-2 to form a dynamically imbalanced SLIP interface with predicted tipped bearing surface interface 310 as shown in FIG. 10. A tip portion of the stepped tier 298 at the tipped bearing surface interface 310 is textured as illustrated schematically to form a roughened tribological bearing surface for stiction control for contact starts and stops. The textured surface area at the tipped interface 310 is relatively small in comparison to the elevated bearing surface area so that the roughened surface portion does not significantly interfere with dynamics of the air bearing.

A slider for a data head including a dynamically imbalanced slider landing integrated pad (SLIP) interface 202 forming a predicted tipped interface 204. For contact starts and stops the SLIP interface 202 supports the slider so the slider tips at the predicted tipped interface 204. The tipped interface 204 includes a tribological surface to provide desired stiction control at the tipped interface 204.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic disc drive system, it will be appreciated by those skilled in the art that the teachings of the present invention can be applied to other systems, like optical or magneto-optical systems, without departing from the scope and spirit of the present invention.

What is claimed is:

1. A slider comprising a slider body having a leading edge, a trailing edge and opposed first and second side portions extending along a length of the slider between the leading edge and the trailing edge and the slider body including a raised bearing surface including a raised center pad and at least one recessed bearing surface and including a slider integrated pad elevated above the raised bearing surface on the first side portion dynamically imbalanced relative to the second side portion to form a predicted tipped interface for the slider on the second side portion.

2. The slider of claim 1 wherein the first side portion forms an inner side portion and the second side portion forms an outer side portion and the inner side portion includes the dynamically imbalanced elevated slider integrated pad and the outer side portion includes the predicted tipped interface.

3. The slider of claim 2 wherein the slider integrated pad is on a trailing edge portion of the inner side portion and is dynamically imbalanced relative to a trailing edge portion of the outer side portion to form the predicted tipped interface at the trailing edge portion of the outer side portion.

4. The slider of claim 3 wherein a leading edge portion of the inner side portion and a leading edge portion of the outer side portion include dynamically balanced slider integrated pads.

5. The slider of claim 1 wherein the elevated slider integrated pad and the predicted tipped interface are formed on a portion of raised bearing surfaces of the slider body.

6. The slider of claim 5 wherein the portion of the raised bearing surface of the predicted tipped interface is textured.

7. The slider of claim 1 wherein the raised bearing surface includes opposed first and second bearing rails on the first and second side portions of the slider body and the dynamically imbalanced slider integrated pad is formed on the first bearing rail and the predicted tipped interface is formed on a portion of the second bearing rail.

8. The slider of claim 7 wherein the portion of the second bearing rail of the predicted tipped interface is textured.

9. The slider of claim 7 wherein the first and second bearing rails include multiple surface tiers including U-shaped tier portions elevated above a recessed tier portion forming damping trenches on the first and second bearing rails and the dynamically imbalanced slider integrated pad on the first side portion extends from the U-shaped tier portion of the first bearing rail.

10. The slider of claim 9 wherein the dynamically imbalanced slider integrated pad is formed of a layer deposited on the U-shaped tier portion of the first bearing rail.

11. The slider of claim 1 wherein each of the first and second side portions include a plurality of slider integrated pads including the dynamically imbalanced slider integrated pad on the first side portion.

* * * * *